United States Patent [19]

Rills

[11] 4,411,442
[45] Oct. 25, 1983

[54] FOOT-POWERED WHEELED VEHICLE

[76] Inventor: Nolan J. Rills, 836 Mary Ave., Opelousas, La. 70570

[21] Appl. No.: 293,497

[22] Filed: Aug. 17, 1981

[51] Int. Cl.³ .............................................. B62M 1/04
[52] U.S. Cl. ..................................... 280/221; 74/133; 74/577 M; 280/254; 280/87.04 A
[58] Field of Search ................... 280/11.115, 221, 253, 280/254, 255, 87.04 A, 87.04 R, 252, 256, 257, 258; 74/130, 133, 142, 156, 577 M

[56] References Cited

U.S. PATENT DOCUMENTS

| | | | |
|---|---|---|---|
| 936,173 | 10/1909 | Schoenberg | 280/11.115 |
| 3,019,760 | 2/1962 | Berliner | 280/254 X |
| 3,396,990 | 8/1968 | Hayes | 280/11.115 X |
| 3,399,906 | 9/1968 | Portnoff | 280/254 X |
| 3,415,540 | 12/1968 | Portnoff | 280/221 |
| 4,159,830 | 7/1979 | Solimine | 280/87.04 A X |

*Primary Examiner*—Joseph F. Peters, Jr.
*Assistant Examiner*—Michael Mar
*Attorney, Agent, or Firm*—Charles C. Garvey

[57] ABSTRACT

A foot-powered wheeled vehicle provides a frame having a platform normally occupied by a user. A pair of spaced apart front and rear trucks each supports a pinion geared shaft and a pair of wheels affixed to opposite ends of the shaft and rotatably with respect to the platform. A pair of independently actuable front and rear foot pedals hingedly are connected to the frame, each of the pedals being movable as desired by the operator between upper relaxed and lower depressed positions with each of the pedals being capable of imparting rotational energy to the wheels associated with its truck. Return springs are associated with each of the pedals for independently biasing each of the pedals toward the upper position which is overcome only by depression by the foot of the operator. Each pedal provides a curved toothed gear rack which is connected at its uppermost end portion to the pedal and which drivingly engages the pinion gear portion of the shaft responsive to depression of the pedal. The front pedal hingedly connects to the frame at the central portion thereof with its associated rack being forward thereof and engaging the forwardmost side of the pinion gear. The rearmost pedal hingedly connects to the frame at the central portion of the frame and aft of the first pedal with its associated rack being rearward of the pinned connection and with the rack engaging the front side of its associated pinion gear. The pedals can be independently actuated as desired by the user to apply moving force to either the front or rear truck as desired or simultaneously thereto.

6 Claims, 6 Drawing Figures

FOOT-POWERED WHEELED VEHICLE

BACKGROUND OF THE INVENTION

1. Field of the Invention

The present invention relates to foot-powered wheeled vehicles such as skateboards, scooters, wheeled platforms, and the like. Even more particularly, the present invention relates to a foot-powered wheeled platform which is actuated by either foot of the operator in an independent fashion with either foot being capable of imparting moving power to the platform independently, simultaneously, or with both feet in a resting position as during coasting.

2. General Background

Many vehicles have been designed over the years which have attempted to provide a self-propelled wheeled vehicle which can be operatored without the need for auxiliary power such as a motor or the like.

Many of these devices through some type of mechanism have attempted to take power from the foot of an operator standing on the platform and transform this into rotational driving force to the wheels of the vehicle to thus propel the vehicle along at a comfortable or desired speed.

Many of these devices have included various types of skate boards, scooters, sleds, bicycles, or the like.

Several devices have been patented which have attempted to provide a solution to the problem of an individual along on a wheeled vehicle where the driving force for the vehicle comes from the power supplied thereto by the feet usually of the operator.

U.S. Pat. No. 1,014,279 provides an "Amusement Vehicle" which provides a platform, a plurality of support wheels, and a driving mechanism which is actuated by means of a pair of foot pedals positioned side by side and each having a depending pall which extends through apertures in the platform to contact with ratcheted wheels.

In U.S. Pat. No. 1,761,601 there is provided a "Foot Power Skooter" having a platform which provides a toothed driving member having engagement with a pinion gear provided on a shaft of the wheel vehicle.

U.S. Pat. No. 1,259,592 shows a wheeled vehicle having a single foot pedal which is occupied by both feet of the operator with the pedal being pivotally supported at its center so that a rocking motion of the operator imparts rotational driving force to the wheel of the vehicle through a gear arrangement.

A "Foot Mobile" is the subject of U.S. Pat. No. 1,440,372. In that patent a platform 8 is equipped with a geared mechanism which includes a curved rack 16 that engagedly drives a toothed shaft. A return spring attempts to bias the platform to an upper position.

A "Skooter" is the subject of U.S. Pat. No. 1,574,516. In that patent front and rear wheels are provided to the skooter with a steering column being attached to the forwardmost wheel. To one end of the platform is secured a geared rack which meshes with the gears of a rear axial and imparts driving energy thereto.

In U.S. Pat. No. 1,632,308 there is provided a "Toy Vehicle" having a pair of spaced apart pedals each engaging through a rack mechanism a provided pair of spaced apart pinion gear which are in turn geared by means of a chain and sprocket to the wheels of the vehicle which engage the road surface.

In U.S. Pat. No. 3,362,723 there is provided a "Propelled Scooter" having a single platform upon which an individual would stand and impart energy thereto which would drive the device. A toothed rack pivoted at its upper end to the rear end of the provided treadle platform engages the teeth of the gear and is maintained in engagement by a yoke straddling the rack and pivoted on the axle. Provided on the axle is a ratchet which is engaged by a spring-pressed pall on the wheel. A teetering action of the treadle by the feet of the operator of the scooter will actuate the rack to rotate the gear to drive the rear wheel in a forward direction.

A later patent, U.S. Pat. No. 4,159,830 shows a "Wheel Truck for Steerable Platform" such as a skateboard. The truck includes a base frame mounted below the platform and carrying a vertical support shaft and downwardly inclined steering shaft. An axletree upon which wheels are mounted is carried from the frame by resilient support means. The support means includes a pair of elastomeric bushings mounted about both of the support and steering shafts. The bushings are seated in sockets formed in the axletree for positioning the latter with respect to the frame. Fasteners are provided to secure the bushings on the shaft. The fasteners are adapted to change the steering response or to vary angular orientation of the axletree for purposes of changing the turning radius.

Though many of these devices attempt to solve in various ways the problem of moving a skateboard like vehicle by means of foot power alone, non provide an apparatus which allows a substantially flat frame skateboard type vehicle to be moved in a desired direction and at a desired speed where either foot or both feet of the operator can impart rotational energy to the device while at the same time placing the feet in a position which enhances statability and removes the necessity for vertically projecting steering columns and the like which compound the change of injury.

3. General Discussion of the Present Invention

The present invention provides a foot-powered, wheeled vehicle which utilizes a platform frame providing an upper platform surface normally occupied by a user. A pair of spaced apart front and rear trucks each are connected to the platform and are each supporting a pinion geared shaft with each shaft having a pair of wheels affixed thereto at opposite end portions. The wheels are rotatably and driving affixed to the trucks with respect to the platform.

A pair of independently actuable front and rear foot pedals are provided each being hingedly connected to the frame with each of the pedals being movable between upper relaxed and lower depressed positions. The front pedal is pivotally mounted at the center portion of the platform with its movable tip portion being directed forwardly thereof. The rear foot pedal is hingedly connected at its front edge at the central portion of the platform with its rear free end depending rearwardly from its point of attachment. This places both pedals in fore and aft relation with respect to one another allowing the user to occupy the platform with both feet being in a fore and aft position, one behind the other, increasing stability during operation. Return springs are associated with each of the pedals for independently biasing each of the pedals toward the uppermost position when not being depressed.

A curved toothed rack is connected to each of the pedals respectively and drivingly engages the pinion geared shaft responsive to depression of the pedal.

It is thus an object of the present invention to provide a wheeled vehicle which is foot actuated by means of a pair of spaced apart fore and aft pedals which are independently actuable to impart either alone or together driving force to the wheeled vehicle.

Another object of the present invention is to provide a wheeled vehicle which can be powered by either foot and can be steered by shifting the weight of the operator from side to side.

It is another object of the present invention to provide a foot powered vehicle which allows either or both feet to actuate the vehicle while at the same time allowing either or both feet to relax during coating.

Another object of the present invention is to provide a foot powered wheeled vehicle where driving force can be applied from the pedal portion of the vehicle to the wheels even during the turning thereof.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 5 is a partial side view of the preferred embodiment of the apparatus of the present invention illustrating an alternate support brace arrangement portion thereof; and FIG. 6 is a sectional view taken along lines 6—6 of FIG. 5.

DETAILED DESCRIPTION OF THE PREFERRED EMBODIMENT

Figure 1:
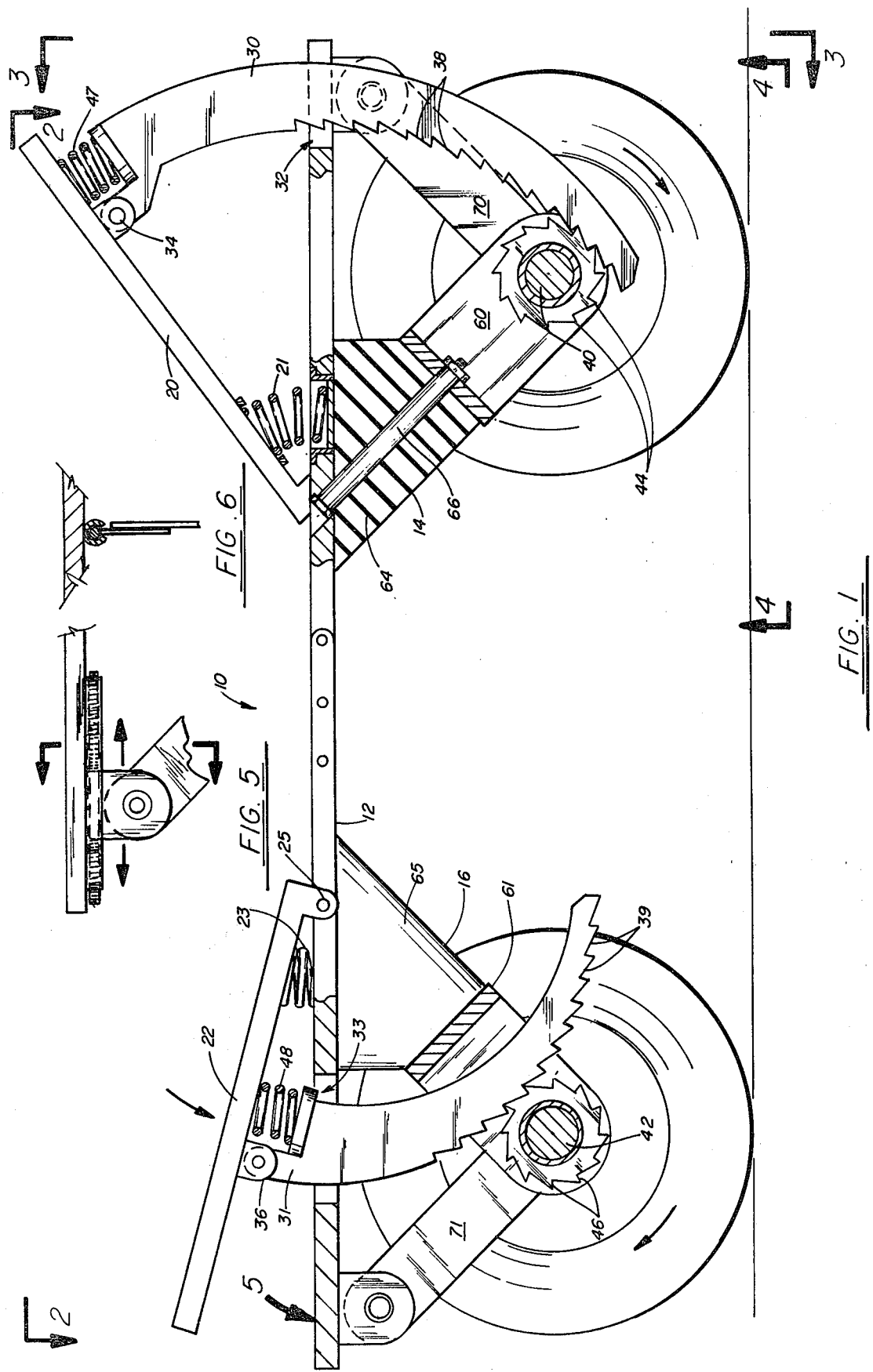
FIG. 1 is a side view of the preferred embodiment of the apparatus of the present invention.
Figure 2:
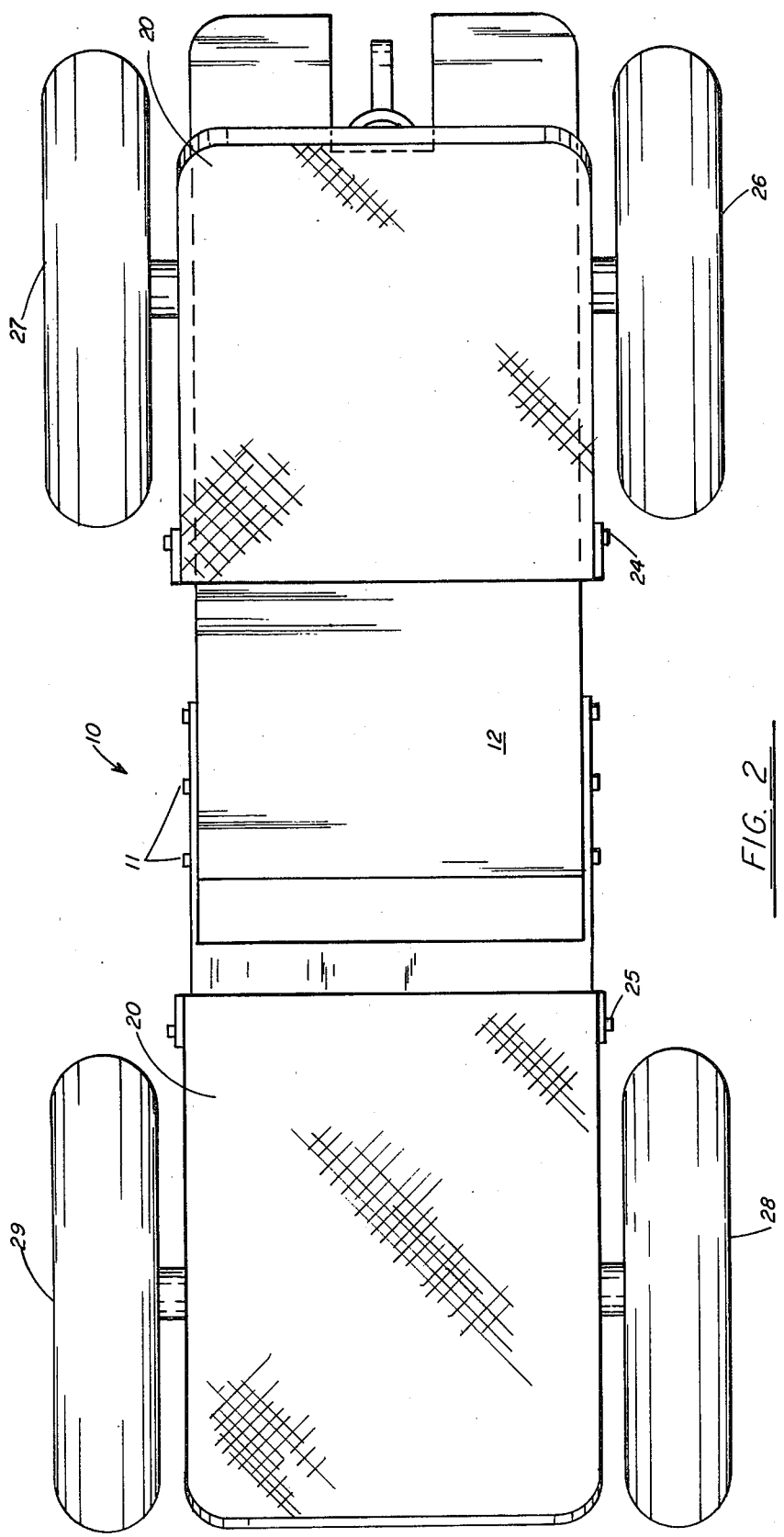
FIG. 2 is a top view of the preferred embodiment of the apparatus of the present invention.

FIGS. 1 through 6 best illustrate the preferred embodiment of the apparatus of the present invention designated generally by the numeral 10.

Wheeled vehicle 10 provides a riding platform 12 which could be, for example, of steel, wood or the like. Platform 12 could be in two parts and bolted together at connections 11 allowing it to be broken down for storage or allowing the insert of an extension member thereinto for lengthening the platform 12.

A pair of spaced apart forward and rear trucks 14, 16 are affixed by bolting, for example, to the underside of platform 12. Each of trucks 14, 16 supports a pair of wheels with front truck 14 having wheels 26, 27 and rear truck 16 having wheels 28, 29.

Each truck has associated therewith a foot pedal with foot pedals 20, 22 being shown as being forward and rear respectively. Each foot pedal is provided with a return spring 21, 23 respectively and a pedal shaft 24, 25 which pivotally attaches each pedal to platform 12.

Each pedal has associated therewith a gear rack with front rack 30 and rear rack 31 being shown as associated with pedals 20, 22 respectively. Openings 32, 33 are provided in platform 12 allowing each rack 30, 31 to pass therethrough. Pivotal connections 34, 36 attach each rack 30, 31 respectively to its associated pedal 20, 22 as the case may be.

Each rack 30, 31 provides a toothed portion 38, 39 having a plurality of teeth which are adapted to engage pinion gears 44, 46, each of which is carried by a front axle 40 and rear axle 42 respectively. Axles 40, 42 are mounted respectively upon brackets 60, 61 which in turn are mounted by means of shafts 66 to platform 12 as is best seen in FIG. 1. Each shaft 66 is surrounded by a resilient rubber bushing 64 which absorbs shock and dampens the steering mechanism as well be described more fully hereinafter.

Return springs 47, 48 urge each rack 30 and more particularly the toothed 38, 39 portions thereof into engagement with pinion gears 44, 46. During the depression of pedals 20, 22 this produces a geared engagement which transfers the foot depression of each pedal into rotational energy of shaft 40, 42.

Figure 3:
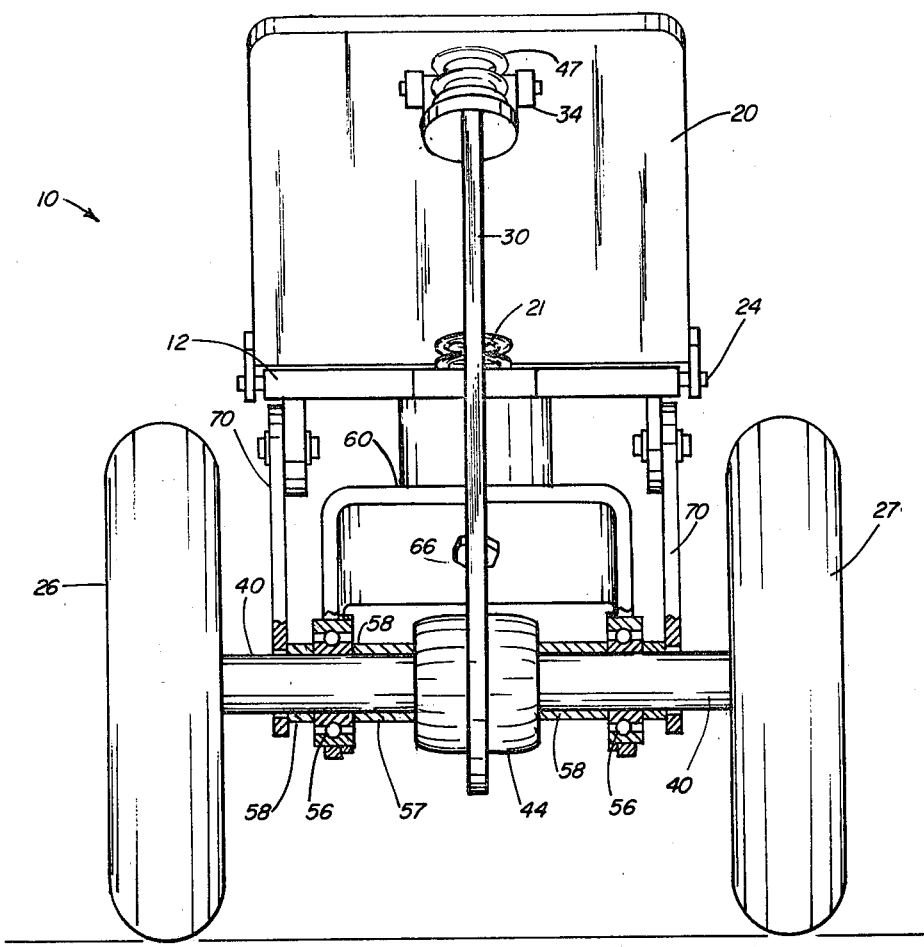
FIG. 3 is a sectional view taken along lines 3—3 of FIG. 1.
Figure 4:
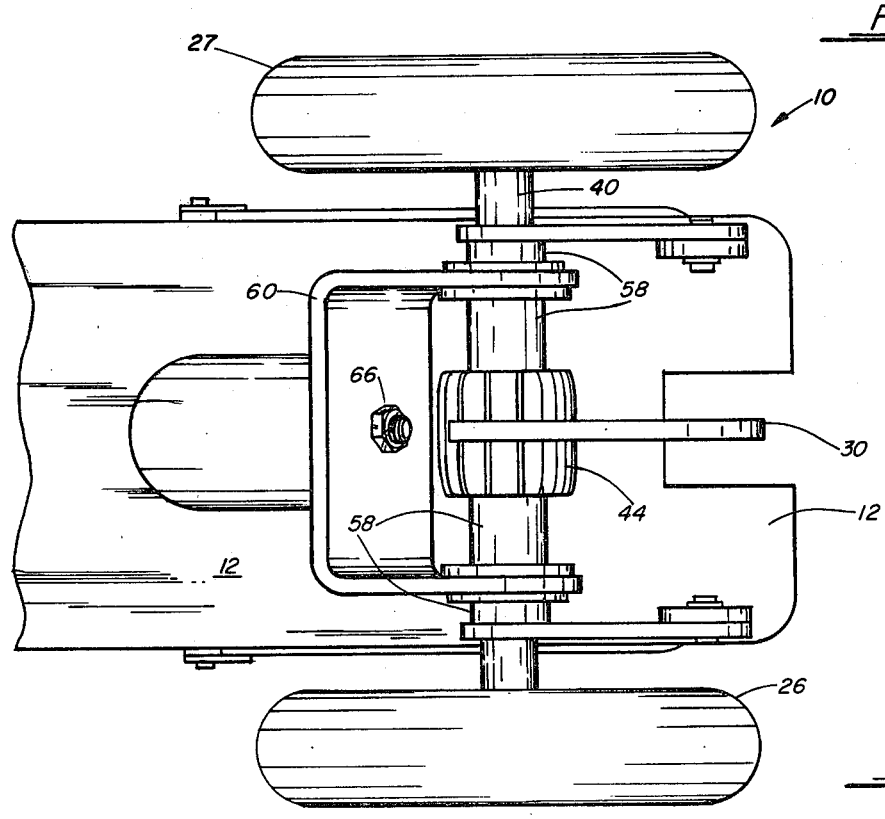
FIG. 4 is a sectional view taken along lines 4—4 of FIG. 1.

The pivotal connections 30, 36, however, allow the racks 30, 31 to slide across the teeth of each pinion gear 44, 46 during movement of each pedal 20, 22 to an uppermost position. Pinion gears 44, 46 can be curved as best seen in FIG. 3 and correspondingly curved teeth can be provided on racks 30, 31 which will insure engagement of racks 30, 31 with its associated pinion gear 44, 46 even while turning. Turning will be effected by a leaning from side to side which will cause each 60, 61 to rotate with respect to its associated shaft 66 thus effecting a movement of shafts 40, 42 to turn vehicle 10.

Shafts 40, 42 are connected to their respective brackets 60, 61 by means of bearings 56 as is best seen in FIG. 3. Spacer sleeves 58 as needed can be provided to properly register each bracket 60, 61 upon shaft 40 and with respect to pinion gears 44, 46. Wheels 26-29 and pinion gears 44 would be preferably firmly attached to shafts 40 and would rotate therewith. Struts 70 would be provided at the edge of each side of platform 12 and would affix to shaft 40 by slipping thereover at a provided opening.

At its uppermost portion, each strut 70, 71 would be spring dampened with a race being provided in which each strut would ride with each strut moving fore and aft as needed during turning.

Supports 71 could be of a flexible yet supportive material such as stiff rubber or like strapping, allowing "give" while turning. Alternatively, supports 71 would be movably mounted (as shown in FIGS. 5-6) with respect to platform 12 by means of bracket 75, having an enlarged attached upper bearing pin 77 which travels fore/aft within slotted race 79.

Springs 80, 81 would absorb shock while allowing fore/aft movement of bracket 75 and thus of support 71 as shown by arrows 81. The ends of race 79 could be threaded to receive allen screws 83, 84 or the like which would retain springs 80, 82 within race 79.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

What is claimed as invention is:

1. A foot-powered, wheeled vehicle comprising:
   a. a frame including a platform adapted to accommodate both feet of an operator;
   b. a pair of spaced apart front and rear trucks, each truck supporting a shaft and at least two wheels affixed to said shaft at the outermost end portions thereof and being rotatably mounted with respect to said platform;

c. an independently depressable front and rear foot pedal cooperating with each truck, each pedal being pivotally connected to said frame and movable between upper and lower positions, the forwardmost pedal being connected to the frame so that the free end portion of the pedal faces the front of the vehicle and the rearmost of said pedals being connected to the frame so that the free end portion of that pedal faces the rear of the vehicle;

d. a return spring associated with each of said pedals for independently biasing each of said pedals toward the upper position; and e. the shaft of each truck and its associated pedal including cooperating gear means for driving the shaft of the associated truck responsive to downward movement of the associated pedal, whereby the vehicle can be propelled by either foot of the operator such as by fore and aft independent foot depression of the operator.

2. The apparatus of claim 1 wherein each of said shafts provides a curved pinion gear.

3. The apparatus of claim 1 wherein said pair of trucks each provides a shaft angularly mounted with respect to said platform and a bracket affixed to the opposite end portion of said shaft from said platform with said bracket carrying said shaft.

4. The apparatus of claim 1 wherein said gear means comprises in part a pinion gear on each truck shaft and an associated curved rack attached to each foot pedal.

5. The apparatus of claim 1 wherein each of said trucks comprises:
   a. a shaft angularly mounted to said platform;
   b. a rubber bushing surrounding said shaft and abutting at one end portion said platform at its opposite end portion a bracket;
   c. a bracket affixed to one end portion of said shaft and supporting said pinion geared shaft at the other end portion thereof.

6. The apparatus of claim 4 wherein said curved racks comprise a pair of spaced apart toothed racks each carried by said pedals, and each of said racks provides a plurality of teeth to engage the pinion gears, and the teeth of said racks are on the rear side portion thereof.

* * * * *